United States Patent
Baker

[11] 4,171,872
[45] Oct. 23, 1979

[54] COMPACT FOUR ELEMENT AFOCAL LENS

[75] Inventor: James G. Baker, Winchester, Mass.

[73] Assignee: Polaroid Corporation, Cambridge, Mass.

[21] Appl. No.: 811,251

[22] Filed: Jun. 29, 1977

Related U.S. Application Data

[63] Continuation-in-part of Ser. No. 569,752, Apr. 21, 1975, abandoned.

[51] Int. Cl.² .............................................. G02B 3/02
[52] U.S. Cl. .................................. 350/212; 350/189; 350/232
[58] Field of Search ............................... 350/212, 232

[56] References Cited

U.S. PATENT DOCUMENTS

| | | | |
|---|---|---|---|
| 3,029,700 | 4/1962 | Price | 350/212 X |
| 3,517,984 | 6/1970 | Lindstedt et al. | 350/212 X |

*Primary Examiner*—Paul A. Sacher
*Attorney, Agent, or Firm*—David R. Thornton

[57] ABSTRACT

A compact substantially afocal lens comprising two components each including two elements adapted for use as a magnifying attachment for an objective with an internal stop. Compactness in an afocal lens of good performance is obtained by the use of a strongly curved first surface followed by other strongly curved surfaces, by the choice of alternating high and low indices of refraction for the successive negative and positive elements, respectively, and by correcting the lens less well for longitudinal color and distortion than for the other aberrations.

44 Claims, 13 Drawing Figures

EXAMPLE I

| SURFACE | RADII | SEPARATION | $N_d$ | $V_d$ |
|---|---|---|---|---|
| 1 | 0.2721 | | | |
| | | 0.1218 | 1.720 | 50.4 |
| 2 | 0.1528 | | | |
| | | 0.0816 | 1.465 | 65.8 |
| 3 | −1.922 | | | |
| | | 0.0214 | AIR | AIR |
| 4 | −4.321 | | | |
| | | 0.0180 | 1.744 | 44.8 |
| 5 | 0.2112 | | | |
| | | 0.0820 | 1.465 | 65.8 |
| 6 | 0.7479 | | | |
| | | 0.0731 | AIR | AIR |
| 1 | 0.2190 | | | |
| | | 0.0189 | 1.678 | 55.2 |
| 2 | PLANO | | | |
| | | 0.0063* | AIR | AIR |
| 3 | −0.5792 | | | |
| | | 0.0079 | 1.511 | 60.4 |
| 4 | 0.3279 | | | |
| | | 0.0105 | AIR | AIR |
| 5 | −0.5321 | | | |
| | | 0.0079 | 1.626 | 35.7 |
| 6 | 0.3397 | | | |
| | | 0.0271 | AIR | AIR |
| 7 | 1.126 | | | |
| | | 0.0168 | 1.651 | 55.9 |
| 8 | −0.2673 | | | |
| | | 1.0004 | AIR | AIR |
| FP | | | | |

*FOCUSED FOR INFINITY WITH ATTACHMENT IN PLACE

FIG. 4

EXAMPLE II

| SURFACE | RADII | SEPARATION | $N_d$ | $V_d$ |
|---|---|---|---|---|
| 1 | 0.2579 | | | |
| | | 0.1218 | 1.720 | 50.4 |
| 2 | 0.1612 | | | |
| | | 0.0816 | 1.465 | 65.8 |
| 3 | -2.93 | | | |
| | | 0.0021 | AIR | AIR |
| 4 | -2.00 | | | |
| | | 0.0180 | 1.717 | 48.0 |
| 5 | 0.1853 | | | |
| | | 0.0820 | 1.465 | 65.8 |
| 6 | 0.7580 | | | |
| | | 0.0734 | AIR | AIR |

*FIG. 5*

EXAMPLE III

| SURFACE | RADII | SEPARATION | $N_d$ | $V_d$ |
|---|---|---|---|---|
| 1 | 0.2969 | | | |
| | | 0.1181 | 1.740 | 28.2 |
| 2 | 0.1619 | | | |
| | | 0.0816 | 1.501 | 56.4 |
| 3 | -1.732 | | | |
| | | 0.0305 | AIR | AIR |
| 4 | -2.888 | | | |
| | | 0.0180 | 1.678 | 55.2 |
| 5 | 0.1755 | | | |
| | | 0.0856 | 1.492 | 57.4 |
| 6 | 0.5777 | | | |
| | | 0.0732 | AIR | AIR |
| 7 | | | | |

EXAMPLE IV

| SURFACE | RADII | SEPARATION | $N_d$ | $V_d$ |
|---|---|---|---|---|
| 1 | 0.2515 | | | |
| | | 0.1102 | 1.713 | 53.8 |
| 2 | 0.1496 | | | |
| | | 0.0814 | 1.465 | 65.8 |
| 3 | 0.5623 | | | |
| | | 0.0180 | 1.713 | 53.8 |
| 4 | 0.1752 | | | |
| | | 0.0725 | 1.465 | 65.8 |
| 5 | 0.4302 | | | |
| | | 0.0210 | AIR | AIR |

FIG. 8

EXAMPLE V

| SURFACE | RADII | SEPARATION | $N_d$ | $V_d$ |
|---|---|---|---|---|
| 1 | 0.2603 | | | |
| | | 0.1290 | 1.713 | 53.8 |
| 2 | 0.1454 | | | |
| | | 0.0850 | 1.465 | 65.8 |
| 3 | 2.53 | | | |
| | | 0.0180 | 1.713 | 53.8 |
| 4 | 0.2155 | | | |
| | | 0.0715 | 1.465 | 65.8 |
| 5 | 0.4783 | | | |
| | | 0.0734 | AIR | AIR |

FIG. 9

EXAMPLE VI

| SURFACE | RADII | SEPARATION | $N_d$ | $V_d$ |
|---|---|---|---|---|
| 1 | 0.2255 | | | |
| | | 0.0841 | 1.720 | 50.4 |
| 2 | 0.1364 | | | |
| | | 0.1065 | 1.487 | 70.4 |
| 3 | 1.705 | | | |
| | | 0.0180 | 1.788 | 50.5 |
| 4 | 0.1723 | | | |
| | | 0.0739 | 1.541 | 47.2 |
| 5 | 0.4067 | | | |
| | | 0.0734 | AIR | AIR |

FIG. 10

EXAMPLE VII

| SURFACE | RADII | SEPARATION | $N_d$ | $V_d$ |
|---|---|---|---|---|
| 1 | 0.2606 | | | |
| | | 0.1290 | 1.720 | 50.4 |
| 2 | 0.1509 | | | |
| | | 0.0955 | 1.465 | 65.8 |
| 3 | -1.725 | | | |
| | | 0.0180 | 1.720 | 50.4 |
| 4 | 0.2066 | | | |
| | | 0.0610 | 1.465 | 65.8 |
| 5 | 0.6700 | | | |
| | | 0.0734 | AIR | AIR |

FIG. 11

EXAMPLE VIII

| SURFACE | RADII | SEPARATION | $N_d$ | $V_d$ |
|---|---|---|---|---|
| 1 | 0.2569 | | | |
| | | 0.1218 | 1.720 | 50.4 |
| 2 | 0.1500 | | | |
| | | 0.0817 | 1.465 | 65.8 |
| 3 | -2.21 | | | |
| | | 0.0180 | 1.720 | 50.4 |
| 4 | 0.2009 | | | |
| | | 0.0820 | 1.465 | 65.8 |
| 5 | 0.7332 | | | |
| | | 0.0734 | AIR | AIR |

FIG. 12

EXAMPLE IX

| SURFACE | RADII | SEPARATION | $N_d$ | $V_d$ |
|---|---|---|---|---|
| 1 | 0.2537 | | | |
| | | 0.1218 | 1.720 | 50.4 |
| 2 | 0.1465 | | | |
| | | 0.0817 | 1.465 | 65.8 |
| 3 | -1.87 | | | |
| | | 0.0180 | 1.720 | 50.4 |
| 4 | 0.1954 | | | |
| | | 0.0820 | 1.465 | 65.8 |
| 5 | 0.7883 | | | |
| | | 0.0734 | AIR | AIR |

FIG. 13

COMPACT FOUR ELEMENT AFOCAL LENS

CROSS REFERENCE TO RELATED APPLICATIONS

This application is a continuation-in-part of my copending application entitled "Compact Four Element Afocal Lens" U.S. Ser. No. 569,752, filed Apr. 21, 1975 now abandoned.

This invention relates to optical systems, and more particularly to a novel four element afocal system.

The ability to extend the focal length of a camera's objective lens with a magnifying attachment without changing the effective aperture ratio of the objective is particularly desirable for use in automatic cameras in which the exposure is determined by a photocell that sees ambient light, but not the light that is falling on the exposure plane. One attachment commonly proposed for this purpose is a form of Galilean telescope.

The Galilean telescope basically comprises a convergent, or positive, component followed by a divergent, or negative, component which, together, form an afocal system; i.e., the object and image planes are at infinity, as are the conjugate focal points. Such a lens condenses a parallel bundle of rays into a smaller parallel bundle, effecting a magnification, when the system is focused through a following objective, that depends upon the ratio of the diameters of the entrant and emergent beams. Such systems have long been known as image magnifying attachments for increasing the effective focal length of a lens.

Typically, a Galilean system suffers from field curvature and distortion, and has a narrow field angle, resulting in appreciable vignetting when used with a camera lens having a normal field of view; for example, 40 to 50 degrees. The problem of designing and correcting such a lens is compounded by the location of the entrance pupil of the camera's lens, which becomes the exit pupil for the afocal attachment, well back in the camera. The result is a highly asymmetrical system, when the attachment is in place, whereas it would be most desirable to have the limiting stop symmetrically located.

Efforts to improve afocal systems have in general had as objectives either to simplify the problem of correcting for aberrations, or to achieve a more compact construction than the simple Galilean telephoto system provides.

As an example of the first approach, U.S. Pat. No. 3,094,580, issued on June 18, 1963 to R. Rosier, describes an afocal system of the concentric type. In the practical embodiment described by Rosier, there are six elements in two air-spaced components. In such a system, the converging and diverging surfaces of the principal parts of the lens are concentric, which considerably simplifies the correction of a number of the significant aberrations. This approach is quite appropriate for use in making a telephoto attachment for small cameras, such as 8 mm. or 16 mm. movie cameras, for example. However, because the physical size of a lens constructed on the concentric principle tends to be large compared to the focal length of the objective with which it is to be used, and because relatively large amounts of expensive glasses are necessarily incorporated in the design, such a lens is not particularly well suited to use with the larger formats.

With six elements, and by the use of a relatively large air space between the front positive and rear negative group of components, I have found it possible to construct a compact afocal system that can be well corrected for any particular objective. Such six element lenses are described in U.S. Pat. No. 3,604,786, issued to me on Aug. 14, 1971, for Compact Afocal Magnifying Lens.

Five element afocal systems that are reasonably well corrected, with the exception of marginal performance with respect to distortion and field curvature, have been designed, for relatively smaller magnifications. For example, the Yashinon 1.4× afocal attachment, as made commercially by the Sun Optical Company of Osaka, Japan is such a lens system.

The principal objects of my invention are to simplify the construction, and to decrease the size and weight of afocal attachments for use with objective lenses having buried stops, while retaining acceptable levels of performance, particularly in the field of medium format photography; i.e., for use with film formats having diagonals from 3 to 6 inches.

The above and other objects of my invention are attained by the construction of a four element Galilean system in which the first two elements form a positive component, and the second pair of elements form a negative component. The first and second components may, but need not be, air spaced. The first component comprises a first negative element having a relatively high index of refraction cemented to a second positive element having a relatively low index of refraction, the curvatures being selected so that the net power of the first component is strongly positive. The second component comprises a first negative element having a relatively high index of refraction, cemented to a second positive element having a relatively low index of refraction, these elements being selected in combination such that the net power is negative and such as to make the system afocal. When constructed in accordance with the particular constraints to be described in more detail below, the result is a compact afocal lens which is characterized by optimizing other corrections at the expense of a limited degree of pin cushion distortion and some sacrifices in longitudinal color correction, particularly in the ultraviolet. Experiments have shown that good quality color prints can be obtained, particularly with Polaroid Sx-70 Land film, so long as the optical system is well corrected for astigmatism coma, spherical aberration, flatness of field and lateral color, reasonably well corrected for distortion, and corrected for longitudinal color except for a fairly considerable latitude in the violet. I have discovered that if this particular compromise is made, an afocal system of surprisingly small size, weight and complexity can be made that has excellent performance compared with constructions of considerably more complexity and greater weight.

The manner in which an afocal system is constructed in accordance with the invention, and the considerations which dictate the construction of particular embodiments of the invention, will best be understood in the light of the following detailed description, together with the accompanying drawings, of various illustrative embodiments of the invention.

Figure 1:
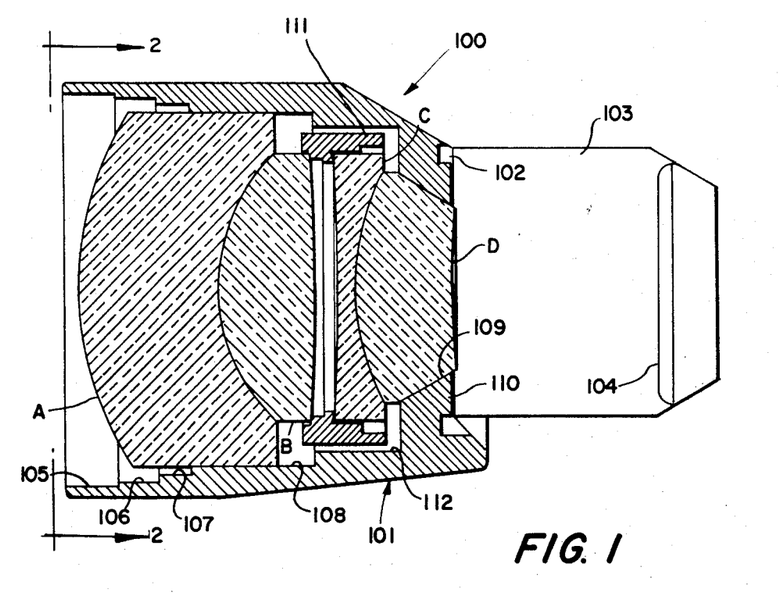
FIG. 1 is a schematic elevational cross-sectional view of an afocal attachment in accordance with the invention.

Referring first to FIG. 1, I have shown an afocal attachment particularly adapted for use with the Polaroid SX-70 Land camera, although it will be readily apparent to those skilled in the art how the apparatus could be modified for use with other cameras or different lenses for the same camera. It should also be noted that the afocal system to be described serves equally well as a wide angle magnifier for use with the eye, for example to get an enlarged image of a distant scene, as of a sporting event.

Figure 2:
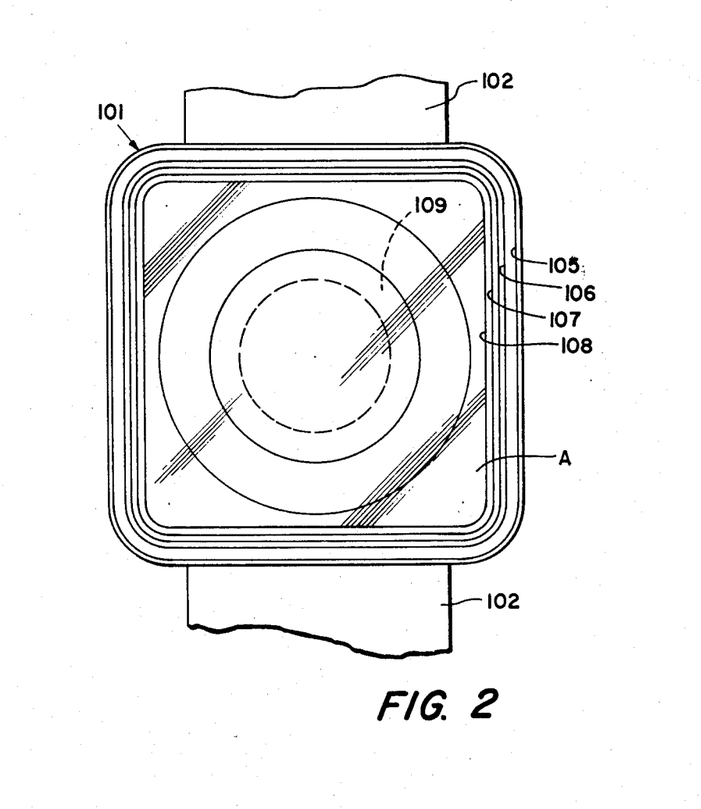
FIG. 2 is a fragmentary front view of the apparatus of FIG. 1, taken substantially along the lines 2—2 in FIG. 1 with parts broken away.

As shown in FIGS. 1 and 2, an afocal system in accordance with the invention has been shown in the form of a magnifying attachment for a camera, generally designated 100. Optical elements forming the afocal system are mounted in a barrel generally designated 101, which may be formed integral with side wings 102, terminating at their ends in extensions 103, adapted to extend around the sides of a lens board and shutter housing, and having lugs 104 formed thereon to engage the rear of the shutter housing. Such an attachment is shown and described in more detail in U.S. application for Letters Patent Ser. No. 533,328, filed on Dec. 16, 1974 by Robert P. Forsyth and Gilbert A. Rose, Sr., for accessory mounting adaptor for photographic apparatus, and assigned to the assignee of this application.

As shown in FIG. 2, the front portion of of the barrel 101 is made square in front elevation, the apparatus being adapted to be attached to a camera with the shape of the barrel in conformity with the shape of an essentially square film format. The purpose of this arrangement is to enable the attachment to be of minimum size and weight and yet still fill the corners of the film with light. A lens shade is formed at the front of the attachment by a series of stepped ledges 105, 106 and 107, which terminate in a generally square recess 108 which receives the front element A of the attachment.

Generally speaking, referring to FIG. 1, the attachment comprises a first positive component consisting of a cemented doublet A and B. The second component of the attachment comprises a cemented doublet comprising a third element C cemented to a fourth component D, the elements C and D forming a component of net negative power. As indicated in FIG. 1, the components may be air spaced. However, within the broader aspects of the invention, as will appear below in connection with the description of FIG. 7 and the examples which accompany it, the first and second components may be cemented together as well.

As shown in FIG. 1, the component D is mounted in a conical recess 109 that is formed as a right circular conical section in a rear ledge portion 110 of the barrel 101. The front element C of the rear component is held in a retaining ring 111, fitted with a somewhat larger cylindrical recess 112. The retaining ring 111 receives the rear corners of the second element B of the first component, and the front element A is retained in position by the square ledge 108. The ring 111 may be annular and symmetrical about the optical axis of the system. All of the elements of the system except the front element A are circular in plan, only the element A being squared off to eliminate bulk and weight for the reasons described above.

Figure 3:
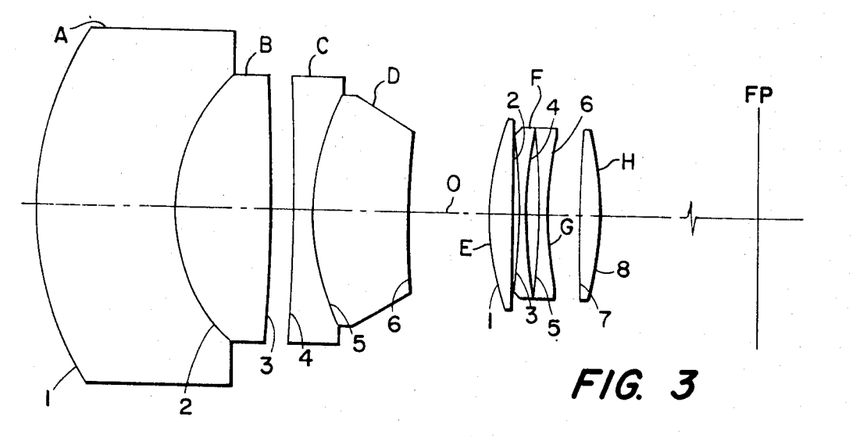
FIG. 3 is a schematic elevational diagram of an afocal attachment in accordance with FIG. 1 shown in its operative association with an objective lens.

Referring next to FIG. 3, there are shown the optical elements of the attachment of FIGS. 1 and 2 with their optical axis O aligned with the optical axis of an objective lens system, here shown as a compact four element objective of the type shown and described more fully in my U.S. Pat. No. 3,695,750, issued on Oct. 3, 1972 for Compact Four Element Objective Lens and assigned to the assignee of this application. As indicated in FIG. 3, this objective comprises a front element E which is moved back and forth along the optical axis to focus the objective, a second element F, a third element G and a fourth element H. The aperture stop for the objective, not shown, is located between elements G and H as shown in my above-cited U.S. Pat. No. 3,695,750.

The focal plane FP of the system is located as indicated in FIG. 3. For purposes of concise exposition, the essential surfaces in the afocal attachment are numbered from 1 through 6 as one proceeds to the right in FIG. 3, and similarly the surfaces of the objective are numbered from 1 through 8 from left to right.

A central characteristic feature of the afocal system of the invention is the front element A of the positive component, which consists of a nearly concentric shell having high curvatures. The radius of the front surface 1 of the element A is chosen in conjunction with the index of refraction of the element A such that surface 1 exhibits a relatively high positive normalized dioptric power, i.e., between 2.3 and 3.5. The normalized dioptric power of a surface of normalized radius R between media having indices of refraction n and n' is given by $n'-n/R$, where R is taken as positive when it extends from the surface into the medium of index n', and is measured by $R = Ru/fo$, where Ru and fo are the radius, and the focal length of the objective with which the system is to be used, in any convenient consistent units of length.

The cemented surface 2 between the elements A and B is selected in conjunction with the indices of refraction of the A and B elements such that the second surface contributes a relatively large negative dioptric power, namely between 1 and 3 and preferably between 1.4 and 2.0 as illustrated in the examples below. Thus, the task of recollimating the rays entering the system from the left in FIG. 3 that have been strongly converged by the first surface 1 is begun at surface 2. The following surfaces 3, 4, 5 and 6 of the attachment finish the task of recollimating an initially parallel bundle of rays entering surface 1, forming a parallel bundle of smaller diameter which is presented to the objective.

The details of the manner in which an afocal lens is constructed in accordance with the invention, within the principles outlined above, will next be considered. In order to simplify the discussion, the specific design of an approximately 1.5× magnifying attachment for an objective of focal length 117.54 mm. with a maximum aperture of f/8 will be given. Unless otherwise noted, all wavelength dependent data given are based on a wavelength of 5876 Angstrom units. All linear, or reciprocal linear, dimensions given are related substantially to the exemplary objective described with a normalized focal length of 1.000, so that they can be scaled to objectives of other sizes by multiplying, for radii, or dividing, for powers, Petzval sums and the like, by the desired objective focal length in any desired units of length. The calculated numerical data set forth herein is subject to minor variation depending on specific assumptions used, methods of calculation, and precision of parameters employed, as those skilled in the art will appreciate.

In order to obtain the desired strong positive first surface 1 for the front element A, a relatively high index of refraction and a relatively short radius are selected. The radius of the surface 1 should be in the range from about 0.22 to about 0.35, with an index of refraction of at least 1.65. Below an index of 1.65, one cannot get enough power in the first surface for the purposes of the invention at a usable value for the radius. One would normally not select an index of refraction above about 1.8, because most known glasses of higher index are too costly, too heavy, exhibit undue transmission losses, or all of these. Below a radius of 0.22 times the objective focal length, the available aperture is too small. Above a radius of 0.35, not enough power is available at a practical value for the index of refraction.

The radius of the cemented surface 2 between the elements A and B is chosen in the range from 0.12 to 0.20 times the objective focal length. Below 0.12, not enough aperture is available, whereas above 0.20 not enough corrective negative power, with practical values for the indices of the elements A and B, can be attained.

The index of refraction of the element B is chosen in the range from 1.44 to 1.58. The lower limit is simply the lowest value for known optical materials of suitable cost and physical properties. Above an index of about 1.58, there would not be sufficient correcting power for coma and spherical aberration.

The surface 3 of the element B may be slightly concave, slightly convex, or plane, with curvatures (reciprocal radii) in the range from +1 to −1 objective focal length.

Figure 7:
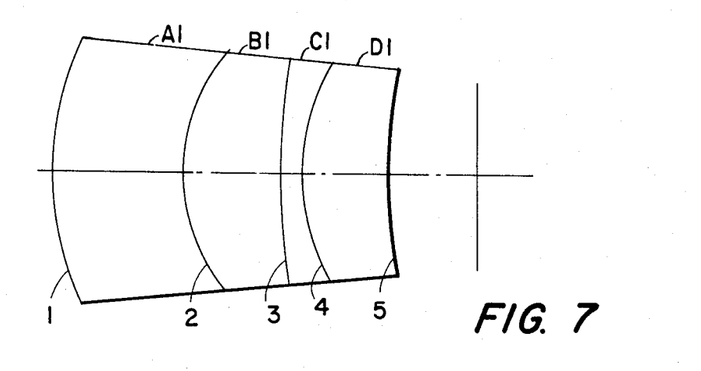
FIG. 7 is a schematic diagram of an afocal system in accordance with another modification of the invention.
Figure 8:
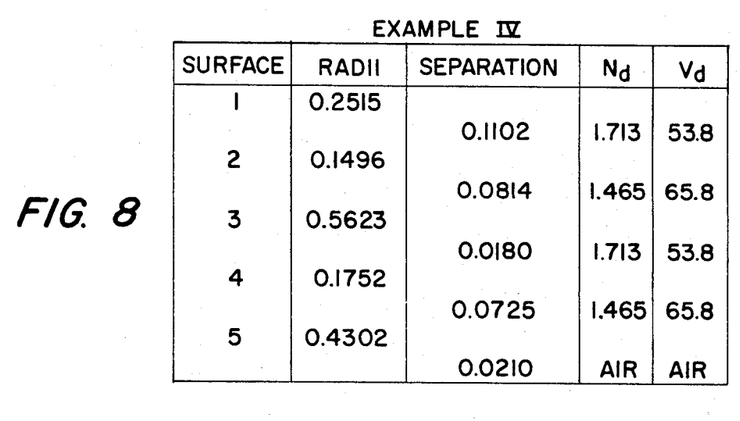
FIG. 8 is a table giving the constructional data for the afocal system of FIG. 7, normalized to the same objective as that in FIGS. 3 and 4.
Figure 9:
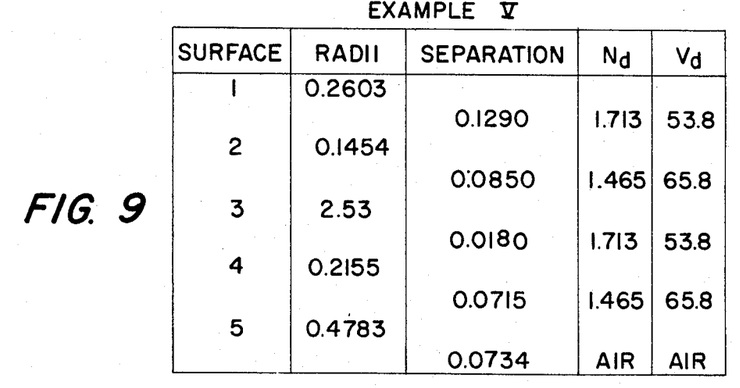
FIGS. 9–13 are tables showing still further modifications of the afocal system of FIG. 7, normalized to the same objective as that of FIGS. 3 and 4.
Figure 10:
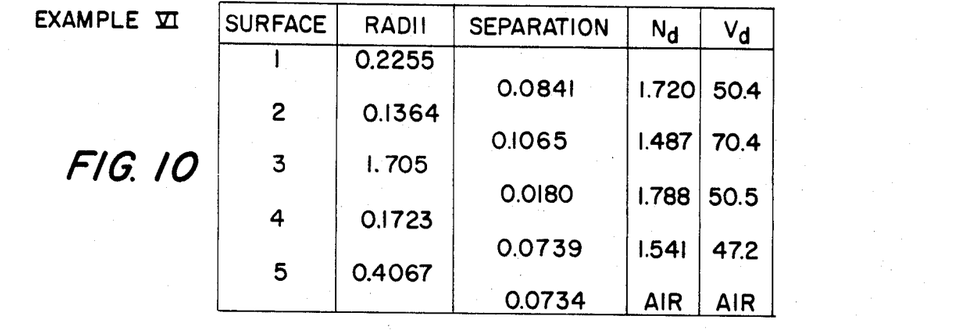
Figure 11:
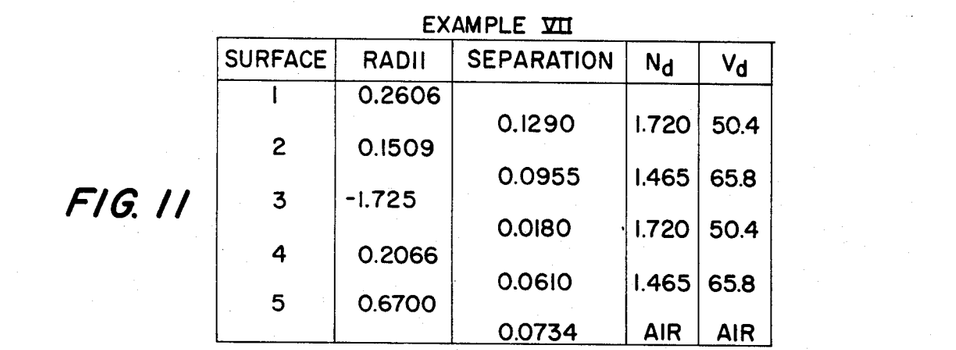
Figure 12:
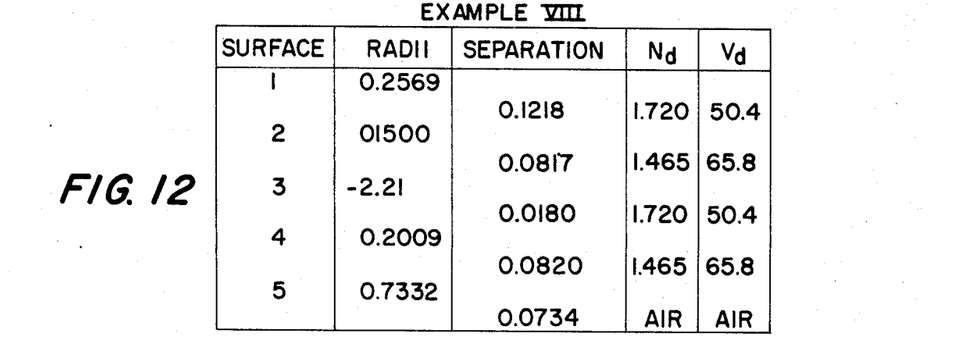
Figure 13:
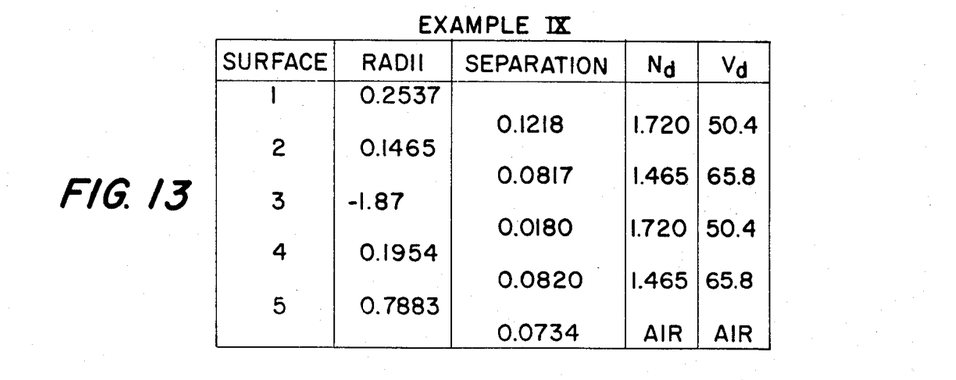

The positive component, comprising the elements A and B, may be air spaced from the negative component, as drawn in FIG. 3, or cemented to it, as shown for the embodiment illustrated in FIG. 7, where the corresponding elements are indicated at A1, B1, C1 and D1, and the second and third elements B1 and C1 are cemented together. I have found that the fully cemented construction of FIG. 7 is capable of reasonably good performance if either the lateral color is allowed to remain undercorrected, or if glass types are changed to correct for lateral color at the expense of further complexity. However, by introducing an air space between the elements B and C; that is to say, by air spacing the first and second components of the system, I was able to obtain favorable anastigmatism without undue distortion while correcting for lateral color. Thus, while either construction could be employed, the air spaced construction of FIG. 3 is presently preferred.

In the fully cemented system of FIG. 7, the first surface of the element C1 is necessarily of the same curvature as the second surface of the element B1, and the radius of this surface may be chosen in the manner described above. For the air spaced version of FIG. 3, the radius of the first surface 4 of the element C, which is a strongly negative element, is preferably chosen in the negative range from infinity to about −2.0; i.e., a curvature range from 0 to −0.5. If the radius becomes positive, it adds undesired positive power to the group. A curvature more strongly negative than −0.5 introduces too much astigmatism.

The index of refraction of the negative third element, C in FIG. 3 and C1 in FIG. 7, should be between 1.60 and 1.88. Below 1.60 the field is too curved; whereas above about 1.88, the glasses available are yellowish, too costly, or both.

The radius of the cemented surface 5 between the elements C and D in FIG. 3, or the corresponding surface 4 between the elements C1 and D1 in FIG. 7, should be between 0.14 and 0.24 objective focal lengths. Below 0.14, one could not obtain the necessary aperture, and there would be overcorrection. Above 0.24, correction for lateral color would be inadequate, and there would not be enough field flattening effect.

The index of refraction of the positive fourth element, D in FIG. 3 and D1 in FIG. 7, should be between 1.44 and 1.58. No practical media are known below 1.44. Above 1.58, inadequate power is available, and the index difference between the positive and negative elements becomes too small to attain flatness of field.

The radius of the final surface, 6 in FIG. 3 or 5 in FIG. 7, is chosen to effect the final adjustment to obtain collimation of a bundle of emergent rays in image space from an originally collimated bundle in object space. The radius may be in the range from 0.4 to 2.0. Below 0.4, the surface is too steeply curved, whereas above 2.0, collimation cannot be effected.

The total thickness of the positive component comprising the elements A and B in FIG. 3 and A1 and B1 in FIG. 7, should be in the range from 0.18 to 0.25 focal lengths. Attempts to obtain good performance while holding this thickness below 0.18 would result in a longer, rather than a shorter, overall barrel length for the system. On the other hand, thicknesses over 0.25 are unnecessary, and add useless bulk, and costly glass, to the system in its largest portion.

The total thickness of the negative component, comprising the elements C and D in FIG. 3 and C1 and D1 in FIG. 7, should be from 0.08 to 0.15 objective focal lengths. Below 0.08, one cannot obtain the necessary aperture. It is unnecessary to go above 0.15, with the attendant increase in bulk, barrel length, and weight of glass or plastic.

The choice of elements of alternating negative power with high indices of refraction and positive power with low indices of refraction is necessary to obtain a more favorable Petzval sum, for the reasons to appear below.

It is desirable to choose the Abbe dispersion values for the first negative element A or A1 in the range between 25 and 61. For the positive elements B, B1, D or D1, the range from 36 to 85 is preferred. In the case of the negative element C or C1, I have found that it is desirable to stay in the range of 40 to 60 for the Abbe dispersion number, to effect good lateral color correction for the system. Within these ranges, the selection is based on conventional design considerations and on the availability of suitable glasses or plastics with particular values in the desired ranges.

Examples of various specific embodiments of the invention will next be described. Each of the examples is described in its specific relation to the particular four element objective of FIG. 3, in which the front element E is the focusing element. In order to contrast the embodiments of the invention to be described with prior art systems designed for similar purposes, data for three such systems will be given, also in relation to the objective of FIG. 3. In each of Examples I–XII below, the data is given relative to the normalized objective focal length of 1.000 in the wavelength 5876 Angstrom units. In Examples I–III and V–VII, the data affected by focus are given with the afocal system of the invention in place, and with the objective focused for substantially infinity usage, i.e. an object distance more than 100 times the focal length, for the full spectral band. In Example IV below, the data are given with the afocal system in place but with the objective focused for portrait usage and for the full spectral band, i.e. focused for an object distance of 8.5 focal lengths.

Figure 4:
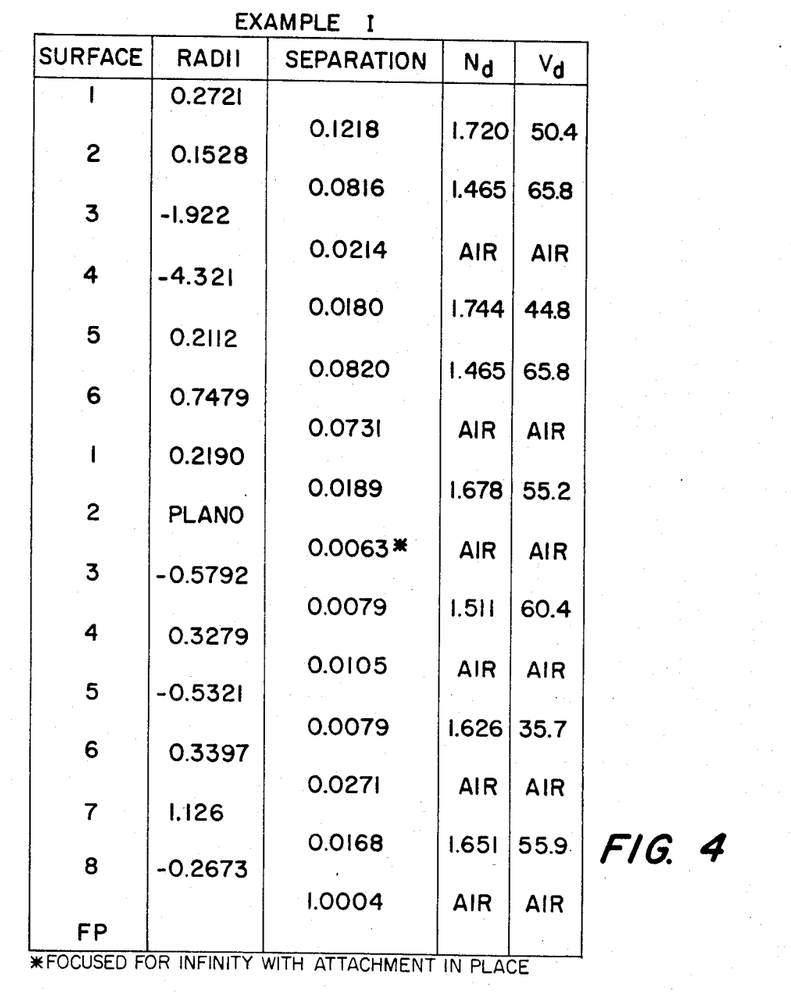
FIG. 4 is a table of the constructional data for the lens system of FIG. 3, normalized to unit focal length for the objective of FIG. 3.
Figure 5:
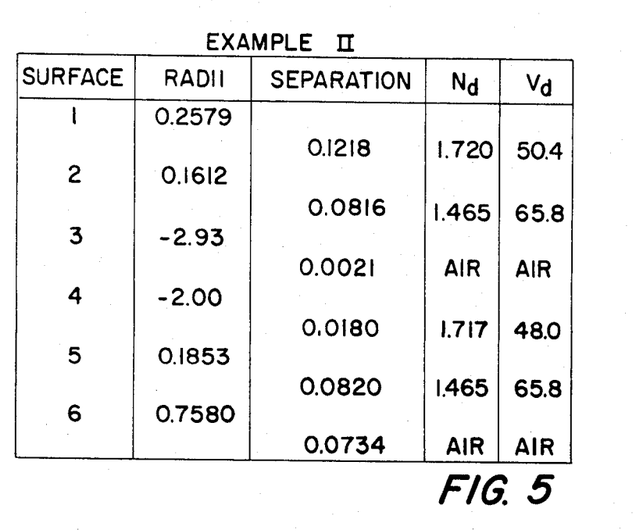
FIG. 5 is a table of constructional data for a modification of the afocal system of FIG. 3, normalized to the same objective as shown in FIG. 3.
Figure 6:
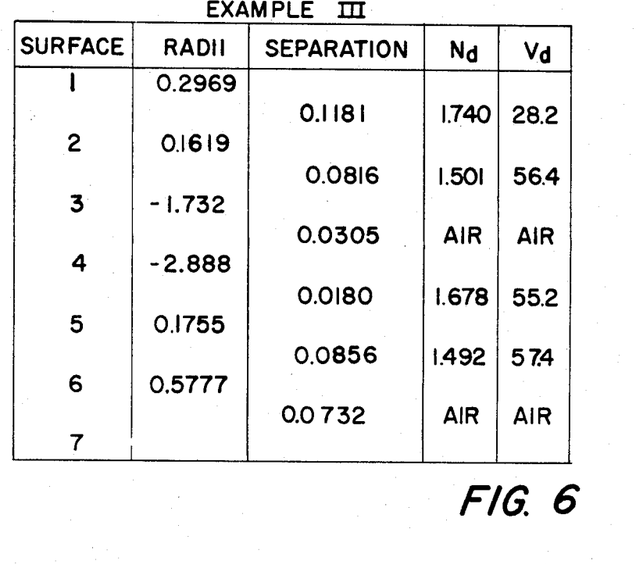
FIG. 6 is a table of the constructional data of another modification of the afocal system of FIG. 3, normalized to the same objective as that in FIG. 3.

Examples I–III below are specific embodiments of the air-spaced system of FIG. 3, and correspond to FIGS. 4, 5 and 6, respectively. Examples IV–IX are specific embodiments of the fully cemented system of FIG. 7, and correspond to FIGS. 8–13, respectively.

In the table titled Example I below, the constructional data for a first specific embodiment of the system of FIGS. 1–3 are given.

EXAMPLE I

| Surface | Radii | Separations | | Glass Types | | |
|---|---|---|---|---|---|---|
| | | Glass | Air | Nd | Vd | Glass |
| 1 | 0.2721 | | | | | |
| | | 0.1218 | | 1.720 | 50.4 | LaK-10 |
| 2 | .1528 | | | | | |
| | | .0816 | | 1.465 | 65.8 | FK-3 |
| 3 | −1.922 | | | | | |
| | | | .0214 | | | |
| 4 | −4.321 | | | | | |
| | | .0180 | | 1.744 | 44.8 | LaF-N2 |
| 5 | .2112 | | | | | |
| | | .0820 | | 1.465 | 65.8 | FK-3 |
| 6 | .7479 | | | | | |
| | | | .0731 | | | |
| 1 | .2190 | | | | | |
| | | .0189 | | 1.678 | 55.2 | LaK-N12 |
| 2 | plano | | | | | |
| | | | .0063 | | | |
| 3 | −.5792 | | | | | |
| | | .0079 | | 1.511 | 60.4 | K-7 |
| 4 | .3279 | | | | | |
| | | | .0105 | | | |
| 5 | −.5321 | | | | | |
| | | .0079 | | 1.626 | 35.7 | F-1 |
| 6 | .3397 | | | | | |
| | | | .0271 | | | |
| 7 | 1.126 | | | | | |
| | | .0168 | | 1.651 | 55.9 | LaK-22 |
| 8 | −.2673 | | | | | |
| | | | 1.0004 | | | |
| FP | | | | | | |

In Example I above, the numbered surfaces 1 through 6 at the top of the table are for the corresponding numbered surfaces of the elements A, B, C and D of the afocal system of FIG. 3. The next series of surfaces 1 through 8 in the lower portion of the table are correspondingly numbered surfaces of the elements E, F, G and H of the objective, and FP is the image focal plane of the system. Radii and separations between surfaces in glass or air are given as fractions (or multiples) of the unit focal length of the objective. Indices of refraction are listed under Nd, Abbe dispersion numbers under Vd.

The spacings affected by focusing are those between surface 6 of the afocal attachment and surface 1 of the objective, between surfaces 2 and 3 of the objective, and between surface 8 of the objective and the focal plane.

EXAMPLE II

| Surface | Radii | Separations | | Glass Types | | |
|---|---|---|---|---|---|---|
| | | Glass | Air | Nd | Vd | Glass |
| 1 | .2579 | | | | | |
| | | .1218 | | 1.720 | 50.4 | LaK-10 |
| 2 | .1612 | | | | | |
| | | .0816 | | 1.465 | 65.8 | FK-3 |
| 3 | −2.93 | | | | | |
| | | | .0021 | | | |
| 4 | −2.00 | | | | | |
| | | .0180 | | 1.717 | 48.0 | LaF-N3 |
| 5 | .1853 | | | | | |
| | | .0820 | | 1.465 | 65.8 | FK-3 |
| 6 | .7580 | | | | | |
| | | | .0734 | | | |

Example II above gives the data for a second example of the afocal system of FIG. 3. Data is given in the same terms as in Example I, including the last separation, which is the air space between surface 6 of the attachment and surface 1 of the objective. The data for the objective are not repeated, being the same as for Example I except for details to be summarized in Table I below. The same comment applies to Examples III–IX below.

EXAMPLE III

| Surface | Radii | Separations | | Glass Types | | |
|---|---|---|---|---|---|---|
| | | Glass | Air | Nd | Vd | Glass |
| 1 | .2969 | | | | | |
| | | .1181 | | 1.740 | 28.2 | SF-3 |
| 2 | .1619 | | | | | |
| | | .0816 | | 1.501 | 56.4 | K-10 |
| 3 | −1.732 | | | | | |
| | | | .0305 | | | |
| 4 | −2.888 | | | | | |
| | | .0180 | | 1.678 | 55.2 | LaK-N12 |
| 5 | .1755 | | | | | |
| | | .0856 | | 1.492 | 57.4 | Plexi |
| 6 | .5777* | | | | | |
| | | | .0732 | | | |

*Aspheric; $\beta = -4.874$

Example III above represents a departure from the other examples to be described in that the element D was plastic, specifically polymethyl methacrylate, with an aspheric surface 6. The radius is given at the optical axis, and the surface is more fully described by $$x = \frac{cy^2}{1 + \sqrt{1 - c^2 y^2}} + \beta y^4,$$

in which x is the distance to the right along the optical axis from the intersection of the surface 6 with the optical axis to any point on the surface 6, y is the distance from the optical axis to a point on the surface, c is the curvature of the surface 6 (the reciprocal of its radius at the optical axis), and $\beta = -4.874$.

The following Examples IV–IX are specific embodiments of the afocal system of FIG. 7.

EXAMPLE IV

| Surface | Radii | Separations | | Glass Types | | |
|---|---|---|---|---|---|---|
| | | Glass | Air | Nd | Vd | Glass |
| 1 | .2515 | | | | | |
| | | .1102 | | 1.713 | 53.8 | LaK-8 |
| 2 | .1496 | | | | | |
| | | .0814 | | 1.465 | 65.8 | FK-3 |
| 3 | .5623 | | | | | |

EXAMPLE IV-continued

| Surface | Radii | Separations Glass | Separations Air | Glass Types Nd | Glass Types Vd | Glass Types Glass |
|---|---|---|---|---|---|---|
|  |  | .0180 |  | 1.713 | 53.8 | LaK-8 |
| 4 | .1752 |  |  |  |  |  |
|  |  | .0725 |  | 1.465 | 65.8 | FK-3 |
| 5 | .4302 |  |  |  |  |  |
|  |  |  | .0210 |  |  |  |

EXAMPLE V

| Surface | Radii | Separations Glass | Separations Air | Nd | Vd | Glass |
|---|---|---|---|---|---|---|
| 1 | .2603 |  |  |  |  |  |
|  |  | .1290 |  | 1.713 | 53.8 | LaK-8 |
| 2 | .1454 |  |  |  |  |  |
|  |  | .0850 |  | 1.465 | 65.8 | FK-3 |
| 3 | 2.53 |  |  |  |  |  |
|  |  | .0180 |  | 1.713 | 53.8 | LaK-8 |
| 4 | .2155 |  |  |  |  |  |
|  |  | .0715 |  | 1.465 | 65.8 | FK-3 |
| 5 | .4783 |  |  |  |  |  |
|  |  |  | .0734 |  |  |  |

EXAMPLE VI

| Surface | Radii | Separations Glass | Separations Air | Nd | Vd | Glass |
|---|---|---|---|---|---|---|
| 1 | .2255 |  |  |  |  |  |
|  |  | .0841 |  | 1.720 | 50.4 | LaK-10 |
| 2 | .1364 |  |  |  |  |  |
|  |  | .1065 |  | 1.487 | 70.4 | FK-5 |
| 3 | 1.705 |  |  |  |  |  |
|  |  | .0180 |  | 1.788 | 50.5 | LaK-17 |
| 4 | .1723 |  |  |  |  |  |
|  |  | .0739 |  | 1.541 | 47.2 | LLF-2 |
| 5 | .4067 |  |  |  |  |  |
|  |  |  | .0734 |  |  |  |

EXAMPLE VII

| Surface | Radii | Separations Glass | Separations Air | Nd | Vd | Glass |
|---|---|---|---|---|---|---|
| 1 | 0.2606 |  |  |  |  |  |
|  |  | .1290 |  | 1.720 | 50.4 | LaK-10 |
| 2 | .1509 |  |  |  |  |  |
|  |  | .0955 |  | 1.465 | 65.8 | FK-3 |
| 3 | −1.725 |  |  |  |  |  |
|  |  | .0180 |  | 1.720 | 50.4 | LaK-10 |
| 4 | .2066 |  |  |  |  |  |
|  |  | .0610 |  | 1.465 | 65.8 | FK-3 |
| 5 | .6700 |  |  |  |  |  |
|  |  |  | .0734 |  |  |  |

EXAMPLE VIII

| Surface | Radii | Separations Glass | Separations Air | Nd | Vd | Glass |
|---|---|---|---|---|---|---|
| 1 | 0.2569 |  |  |  |  |  |
|  |  | .1218 |  | 1.720 | 50.4 | LaK-10 |
| 2 | .1500 |  |  |  |  |  |
|  |  | .0817 |  | 1.465 | 65.8 | FK-3 |
| 3 | −2.21 |  |  |  |  |  |
|  |  | .0180 |  | 1.720 | 50.4 | LaK-10 |
| 4 | .2009 |  |  |  |  |  |
|  |  | .0820 |  | 1.465 | 65.8 | FK-3 |
| 5 | .7332 |  |  |  |  |  |
|  |  |  | .0734 |  |  |  |

EXAMPLE IX

| Surface | Radii | Separations Glass | Separations Air | Nd | Vd | Glass |
|---|---|---|---|---|---|---|
| 1 | 0.2537 |  |  |  |  |  |

EXAMPLE IX-continued

| Surface | Radii | Separations Glass | Separations Air | Nd | Vd | Glass |
|---|---|---|---|---|---|---|
|  |  | 0.1218 |  | 1.720 | 50.4 | LaK-10 |
| 2 | .1465 |  |  |  |  |  |
|  |  | .0817 |  | 1.465 | 65.8 | FK-3 |
| 3 | −1.87 |  |  |  |  |  |
|  |  | .0180 |  | 1.720 | 50.4 | LaK-10 |
| 4 | .1954 |  |  |  |  |  |
|  |  | .0820 |  | 1.465 | 65.8 | FK-3 |
| 5 | .7883 |  |  |  |  |  |
|  |  |  | .0734 |  |  |  |

The following examples are prior art afocal systems, of five and six elements. No directly comparable four element systems come to mind; prior four element afocal systems of which I am presently aware were designed for narrow field angles, and would be totally unsuitable for use over the 55° field angle for which Examples I-IX are well suited.

EXAMPLE X

| Surface | Radii | Separations Glass | Separations Air | Nd | Vd | Glass |
|---|---|---|---|---|---|---|
| 1 | 0.6048 |  |  |  |  |  |
|  |  | .0605 |  | 1.800 | 45.7 | EOO-46 |
| 2 | plano |  |  |  |  |  |
|  |  | .0173 |  | 1.620 | 36.2 | C20-36 |
| 3 | .2851 |  |  |  |  |  |
|  |  | .3021 |  | 1.620 | 60.2 | C20-60 |
| 4 | .1728 |  |  |  |  |  |
|  |  | .0346 |  | 1.620 | 36.2 | C20-36 |
| 5 | plano |  |  |  |  |  |
|  |  | .0173 |  | 1.800 | 45.7 | EOO-46 |
| 6 | .1338 |  |  |  |  |  |
|  |  |  | .0047 |  |  |  |
| 7 | .1292 |  |  |  |  |  |
|  |  | .0259 |  | 1.501 | 60.9 | BOO-61 |
| 8 | plano |  |  |  |  |  |

Example X above is the six element afocal system described in U.S. Pat. No. 3,094,580, scaled for use with the objective of FIG. 3 described above.

EXAMPLE XI

| Surface | Radii | Separations Glass | Separations Air | Nd | Vd | Glass |
|---|---|---|---|---|---|---|
| 1 | 0.4542 |  |  |  |  |  |
|  |  | .0775 |  | 1.589 | 61.3 | SK-5 |
| 2 | 11.68 |  |  |  |  |  |
|  |  |  | .0042 |  |  |  |
| 3 | .7129 |  |  |  |  |  |
|  |  | .0999 |  | 1.589 | 61.3 | SK-5 |
| 4 | −0.7133 |  |  |  |  |  |
|  |  | .0184 |  | 1.736 | 32.0 | BaSF-53 |
| 5 | 1.348 |  |  |  |  |  |
|  |  |  | .0283 |  |  |  |
| 6 | −7.76 |  |  |  |  |  |
|  |  | .0344 |  | 1.650 | 39.2 | BaSF-10 |
| 7 | −0.3176 |  |  |  |  |  |
|  |  | .0089 |  | 1.589 | 61.3 | SK-5 |
| 8 | .2765 |  |  |  |  |  |
|  |  |  | .0732 |  |  |  |

Example XI above is the commercially available five element Yashinon 1.4x afocal lens referred to earlier, related to the objective of FIG. 3 described above.

EXAMPLE XII

| Surface | Radii | Separations Glass | Separations Air | Nd | Vd | Glass |
|---|---|---|---|---|---|---|
| 1 | 0.4348 |  |  |  |  |  |
|  |  | .0691 |  | 1.518 | 65.1 | PK-2 |
| 2 | 1.375 |  |  |  |  |  |

EXAMPLE XII-continued

| Surface | Radii | Separations Glass | Separations Air | Glass Types Nd | Glass Types Vd | Glass Types Glass |
|---|---|---|---|---|---|---|
| 3 | .2743 | | .0010 | | | |
| | | .1202 | | 1.613 | 58.6 | SK-4 |
| 4 | −0.8308 | | | | | |
| | | .0267 | | 1.606 | 37.8 | F-15 |
| 5 | .4348 | | | | | |
| | | | .0010 | | | |
| 6 | .3260 | | | | | |
| | | .0219 | | 1.691 | 54.7 | LaK-N9 |
| 7 | .1634 | | | | | |
| | | | .0399 | | | |
| 8 | 7.62 | | | | | |
| | | .0170 | | 1.720 | 50.4 | LaK-10 |
| 9 | .1820 | | | | | |
| | | .0370 | | 1.511 | 51.0 | TiF-1 |
| 10 | 1.942 | | | | | |
| | | | .0732 | | | |

Example XII above is the 6 element afocal lens described in U.S. Pat. No. 2,803,167 to Kohler et al, scaled for use with the objective of FIG. 3 described above.

Table I below gives the specific separations affected by focus in Examples I–XII above, repeating the data given in Example I above to make it clear what separations are intended. The data on the objective lens for Examples II–XII are otherwise as given in Example I.

TABLE I

| EXAMPLE | SEPARATIONS BETWEEN OBJECTIVE SURFACES 2 to 3 | SEPARATIONS BETWEEN OBJECTIVE SURFACES 8 to FP |
|---|---|---|
| I | .0063 | 1.0004 |
| II | .0057 | 1.0012 |
| III | .0063 | 1.0004 |
| IV | .0241 | 1.0014 |
| V | .0059 | 1.0014 |
| VI | .0059 | 1.0014 |
| VII | .0057 | 1.0014 |
| VIII | .0057 | 1.0014 |
| IX | .0057 | 1.0000 |
| X* | .0073 | 1.0014 |
| XI* | .0074 | 1.0014 |
| XII* | .0093 | 1.0014 |

*Prior Art

Table II below gives relevant optical data for Examples I–XII above calculated from the constructional data of Examples I–XII by conventional methods relative to an objective of unit focal length. In Table II, BL is the barrel length of the afocal lens from the front surface of the first element to the back surface of the fourth element measured along the optical axis. Hn is the last relative height at the emergent surface of the system, i.e. at surface 8 of the objective (relative to a height of 1 at the entrance pupil). With the embodiments described herein, this value is approximately equal to the value at the surface 6 of the afocal attachment and accordingly, for ease of description, Hn is used herein with reference to either value. fs is the focal length of the system comprising the particular afocal attachment in each example and the objective of FIG. 3. The system focal length fs is the magnification of the attachment, since it is relative to the unit focal length of the objective, and is given rather closely by 1/Hn. B, F, C and E are the Seidel numbers for spherical aberration, coma, astigmatism, and distortion, respectively. Ps is the Petzval sum for the system comprising the attachment and the objective.

It will be apparent from Table II that the four element systems of Examples I–IX compare quite favorably with the five and six element systems of Examples X–XII, in terms of the Seidel aberrations. Example X exhibits extreme spherical aberration B. Coma (F) is highest in Examples IV and VI. Examples XII shows a rather large degree of astigmatism (C) compared with the other examples. Example X has the most distortion, and Example III the least. Example IV, with the most distortion of the four element systems, lies between Examples XI and XII in this regard.

TABLE II

| EXAMPLE | PARAMETER BL | PARAMETER Hn | PARAMETER 1/$H_n$ | PARAMETER B | PARAMETER F | PARAMETER C | PARAMETER Ps | PARAMETER E |
|---|---|---|---|---|---|---|---|---|
| I | .3248 | .667 | 1.499 | −.828 | −.356 | .013 | .195 | −.296 |
| II | .3055 | .672 | 1.488 | .675 | −.786 | −.044 | .133 | −.076 |
| III | .3338 | .665 | 1.504 | −.205 | −.422 | .040 | .124 | −.376 |
| IV | .2821 | .660 | 1.515 | .507 | −.981 | .022 | .066 | −.422 |
| V | .3035 | .665 | 1.504 | .210 | −.759 | .032 | .034 | −.169 |
| VI | .2825 | .655 | 1.527 | 1.013 | −1.118 | .087 | .069 | −.158 |
| VII | .3035 | .665 | 1.504 | .449 | −.711 | −.052 | .108 | −.103 |
| VIII | .3035 | .676 | 1.479 | .072 | −.554 | −.085 | .171 | −.085 |
| IX | .3035 | .675 | 1.481 | −.246 | −.463 | −.109 | .183 | −.081 |
| X | .4624 | .661 | 1.513 | −2.710 | .368 | −.007 | .198 | −.529 |
| XI | .2716 | .704 | 1.420 | −.746 | −.287 | −.068 | −.206 | −.316 |
| XII | .3338 | .586 | 1.706 | −.342 | −.778 | .263 | −.600 | −.445 |

The Petzval sum is a measure of flatness of field in the absence of astigmatism. It is highly desirable to have a small positive Petzval sum in an optical imaging system, because a zero or negative Petzval sum generally implies lack of compensation for the higher-order aberrations. Most objective lenses that are well designed for use alone accordingly have relatively small positive Petzval sums, so that they can be used alone without exhibiting undue evidence of higher order aberrations. Typical of such objectives is the objective of FIG. 3, which by itself has a Petzval sum of +0.198. Accordingly, the optimum Petzval sum for an attachment is small and negative; in the case of the objective of FIG. 3, a negative number less than 0.198 is desired. Referring to Table II above, it will be seen that the system values Ps for the Petzval sums using the four element attachments in accordance with Examples I–IX are all less than the value of 0.198 for the objective, although Example I is only just so. The value Ps using the Rosier design, Example X, is equal to the value for the objective, indicating a Petzval sum for the Rosier attachment of nearly zero. On the other hand, the values Ps for Examples XI and XII are negative, with Example XII being very high.

Table III below gives the Petzval sums Pa for the afocal systems of Examples I–XII calculated without reference to the objective. The third digit is not particularly significant because of the method of calculation, involving differences between indices that are only given to three decimal places, and are wavelength dependent. For all practical purposes, although they were independently calculated, one can go from a Pa value to a Ps value by adding 0.198, the Petzval sum for the objective.

centric with surface 1 at the same separation. The corresponding value for the six element Rosier design, Example X, is also given; there is no meaningful corresponding value for Examples XI and XII.

A measure of what is happening at the successive surfaces of the afocal systems of Examples I-IX is the

TABLE III

| EXAMPLE | PARAMETER | | | | | | |
|---|---|---|---|---|---|---|---|
| | Pa | $\phi 1$ | $\phi 2$ | $\Delta n$ | Cm/Cc | $\Delta CV_2$ | $\Delta CV_3$ |
| I | −.0033 | +2.646 | −1.669 | −.255 | .984 | .811 | .100 |
| II | −.065 | 2.792 | −1.582 | −.255 | .600 | .725 | .320 |
| III | −.074 | 2.492 | −1.476 | −.239 | 1.104 | .708 | .010 |
| IV | −.132 | 2.835 | −1.658 | −.248 | .945 | .808 | −.080 |
| V | −.164 | 2.739 | −1.706 | −.248 | .903 | .825 | .134 |
| VI | −.129 | 3.193 | −1.708 | −.233 | 1.037 | .802 | .177 |
| VII | −.0898 | 2.763 | −1.690 | −.255 | .872 | .803 | .292 |
| VIII | −.0276 | 2.803 | −1.700 | −.255 | .901 | .808 | .269 |
| IX | −.0155 | 2.838 | −1.741 | −.255 | .900 | .830 | .283 |
| X* | +.001 | 1.323 | — | — | 1.848 | — | — |
| XI* | −.403 | 1.297 | — | — | — | — | — |
| XII* | −.798 | 1.191 | — | — | — | — | — |

*Prior Art $\phi i = \frac{n' - n}{Ri}$

Table III above gives certain additional data characteristics of the four element systems of the invention. Where applicable, values are given for Examples X-XII, although in most cases the quite different principles involved in the prior art designs do not permit a meaningful calculation to be made.

Included in Table III are values of $\phi$, the refracting power of the first surface 1 of the first element A or A1 of FIGS. 3 and 7, and of the first surface of the first element in Examples X-XII, respectively. As noted above, the refracting power $\phi i$ of a surface is given by $$\phi i = \frac{n' - n}{Ri}$$

where n and n' are the indices of refraction, and Ri the radius of the surfaces as defined above. It will be seen that $\phi 1$ lies in the range 2.3-3.5 described above for each of Examples I-IX, whereas it is below 1.5 for each of Examples X-XII.

Table III also gives the value $\phi 2$ for the refracting power at surface 2 of the first element in the afocal system of Examples I-IX. There is no directly comparable surface in the afocal system of Examples X-XII. It will be seen that in Examples I-IX, the refracting power at the second surface lies between −1.4 and −2.0.

Another significant characteristic of the four element afocal systems in accordance with the invention is the high difference in refractive index between the successive negative and positive elements, i.e. between the elements of each component. This difference $\Delta n$ is given in Table III for the first and second elements in the afocal systems of Examples I-IX, and is equal to $n' - n$, where n' is the index of the element B or B1, and n is the index of the element A or A1 in FIGS. 3 and 7. Thus, the difference in indices of refraction between the two elements of each of the two components is relatively high, and preferably is greater than 0.2 in at least one component.

A family relationship between the four element systems of Examples I-IX is also illustrated by the values Cm/Cc given in Table III. Cm is the curvature of the strongest cemented surface in the afocal system, which is surface 2 of the afocal system in FIGS. 3 and 7. Cc is the curvature that surface 2 would have if it were concentric with surface 1 at the same separation.

change in convergence of an initially parallel bundle of rays at each surface. $\Delta CV_2$ in Table III is the change in convergence at surface 2 of the attachment. In each instance, this is a positive number near 0.8; the sign indicates that the bundle begins its divergence (i.e. becoming progressively less convergent toward the afocal condition) at this strong negative surface. $\Delta CV_3$ is the corresponding value at surface 3; it is a smaller value, and not of the same sign in all of the examples because the situation becomes more complex further into the system, and the convergence alone has little superficial significance beyond surface 2. Of course, the net result must be a parallel bundle leaving the last surface of the attachment.

Four element afocal systems in accordance with the invention are characterized by good overall performance over a relatively wide field angle; i.e., up to about 55°, with good flatness of field suitable for moderately large formats, by modern standards. A convenient quantitative measure of the characteristics of an afocal system in accordance with the invention, which can be calculated readily from the constructional data for any particular embodiment, is a dimensionless characterizing number Q1 defined by $$Q1 = \left[ \left( \frac{0.1}{fo} - Ps \right) R1 \right]^2 \times 10^3,$$

where fo is the focal length of the objective with which the attachment is to be used, Ps is the Petzval sum Pa+Po, where Pa is the Petzval sum for the afocal system and Po is the Petzval sum for the objective with which the afocal attachment is to be used, and R1 is the radius of the first surface of the afocal system. The term Q1 is expressed in the form shown to help indicate its significance. Obviously, when the normalized (and thus dimensionless) values of the factors, as given in the above description, are used, the same value of Q1 will result; however, the factor 0.1/fo will simply become 0.1 in that case, since the normalized value of fo=1.000. Further, since the principal value of the number Q1 is that it appears to describe afocal systems in accordance with my invention, and to distinguish them from known prior art afocal systems of different design, it is convenient to write Q1 as $$Q1 = 1000\left[(.098 + Pa)R1\right]^2$$

This form gives the same values as the above expression for Q1, but does not require a knowledge of the Petzval sum of a particular objective for which an afocal system was designed to evaluate.

The significance of the dimensionless numbers will be apparent from the following discussion. First, the first radius R1 implies the size of the afocal attachment. If it is large relative to the focal length of the objective for which it is intended, the first surface will have less power and there will be more to be done by following surfaces, employing more surfaces, more bulk, or both. The four element systems in accordance with my invention are characterized by strongly curved first surfaces, a factor which reduces the size of the number Q1. Secondly, as noted above, a small negative Petzval sum Pa for an afocal attachment is highly desirable, so long as the normally positive relatively small Petzval sum Po of the intended objective is not numerically exceeded. The system Petzval sum should be slightly positive to reduce higher ordered aberrations. Further, the larger the format to be covered, the more important it is to have a small Petzval sum for better flatness of field. These factors are taken into account in the term $((0.1)/fo - Ps)$ of the number Q1. As Q1 is defined, a Petzval sum Ps equal to 0.1/fo would give a value of 0 for Q1, and this value may be considered an optimum to the extent that Q1 has validity as a figure of merit. In particular, however, my four element systems characteristically exhibit much smaller values of Q1 than the five and six element systems with which they are here compared.

The factor $10^3$ in Q1 is arbitrary; it is chosen simply to bring the computed values into a convenient range.

Values of Q1, as defined above, would be expected to be below 1 for the four element systems in accordance with my invention, as illustrated by the values given in Table IV below for Examples I-IX. On the other hand, the values for the prior art five and six element systems of Examples X, XI and XII are all greatly in excess of 1.

A second characteristic number Q2, which is essentially a measure of bulkiness for a given magnification, may be defined as $$Q2 = 10\left(\frac{BL}{fo}\right)\left(\frac{fo}{fs}\right)^3$$

The factor 10 is simply a convenience factor, selected to produce values near 1.0 for my systems. Any other number used in its place would exhibit the same significant properties of Q2.

The ratio of the barrel length BL of the attachment to the focal length fo of the objective is clearly a measure of the bulkiness of the attachment. Since the bulk of the attachment is drastically affected by its magnification, that fact is taken into account by the introduction of the cube of the factor (fo/fs), in which fo/fs is the reciprocal of the magnification. It will be apparent that, using the normalized factors given in the above examples, and the sufficiently accurate approximation fo/fs=Hn described above, for purposes of computation Q2 can be written as $$Q2 = 10BL(Hn)^3$$

Values of Q2 for Examples I-XII are given in Table IV below. It will be seen that the values are closely grouped for Examples I-IX in a range below 1.2 that is between the values for Examples X and XII and near the value for Example XI.

A third number Q3 that is essentially a figure of merit for astigmatism can be defined as $$Q3 = 400\,fo^2\,C^2$$

where C is the Seidel astigmation given in Table II above. In normalized form, the expression becomes $$Q3 = 400C^2,$$

in which the factor 400 is an arbitrary scaling constant, as above.

Values of Q3 are given in Table IV below for Examples I-XII. It will be seen that the values for Examples I-IX are all below 5; and for Examples I-V, all below 1. Example X has a very low value of 0.02 for Q2, but this must be considered in the light of the excessive spherical aberration (B in Table II). Example XII obviously suffers badly from astigmatism over the field angle required for comparison with the other examples.

A fourth characteristic number Q4, which is essentially a figure of merit for distortion, may be defined as
$$Q4 = 10E^2$$

where E is the Seidel distortion given above in Table II. The factor 10 is selected relative to the factor 400 in Q3 to give approximately appropriate relative weights to the two factors.

Values of Q4 are given in Table IV below for Examples I-XII. It will be seen that the values for Examples I, II and V through IX are all below 1.0, while the values for Examples III and IV are below the values for Examples X and XII.

The numbers Q1 and Q2, defined above and given for the specific examples in Table IV below, serve particularly to characterize the four element systems in accordance with my invention, as they collect most of the relevant parameters in a meaningful way descriptive of the generic characteristics of the invention. These factors may be combined to form a further descriptive number M1, where M1 is the root mean square of Q1 and Q2.

Values of M1 are given in Table IV below for each of Examples I-XII. It will be apparent that M1 is less than 1 for each of Examples I-IX, considerably in excess of 1 for Example X, and greatly in excess of 1 for Examples XI and XII.

An overall performance figure M2 for comparing afocal systems can be defined as the root mean square of the numbers Q1, Q2, Q3 and Q4 defined above. Values of M2 for Examples I-XII are given in Table IV below.

A high value of M2 indicates either that a given afocal system is poorly designed for its task, or that it has been designed along quite different lines from my systems. A low value is not quite as significant. To illustrate, Example XI is quite the best of the prior art examples given, for the purposes described, in terms of overall performance. It has an overall figure M2 that is very high relative to those for my systems only because it was designed on completely different principles, as indicated by its very high value of the descriptive number Q1. The extremely high value for Example XII reflects both a different design approach, illustrated by Q1=92.64, and excessive astigmatism, as illustrated by Q3=27.67. The value M2 for Example X, though near the high side, is within the range of my Examples I–IX. The value Q1=3.51 for Example X indicates the considerable difference in design, but is still low enough to reflect the common factor, which is that both my system and the Rosier system represent departures from the concentric approach. In my Example IX, the astigmatism number Q3 is high enough, relative to the very low value for Example X, to overcome the difference between the Q1 values, so that M2 for Example IX is slightly greater than the value for Example X.

TABLE IV

| EXAMPLE | PARAMETER | | | | | |
|---|---|---|---|---|---|---|
| | Q1 | Q2 | Q3 | Q4 | M1 | M2 |
| I | 0.67 | 0.96 | 0.07 | 0.88 | .832 | .735 |
| II | 0.07 | 0.93 | 0.77 | 0.06 | .659 | .606 |
| III | .06 | .98 | .64 | 1.41 | .691 | .917 |
| IV | .12 | .82 | .19 | 1.78 | .59 | .99 |
| V | .31 | .89 | .41 | .29 | .67 | .53 |
| VI | .05 | .80 | 3.03 | .25 | .57 | 1.57 |
| VII | .00 | .89 | 1.08 | .11 | .63 | .70 |
| VIII | .31 | .94 | 2.89 | .07 | .70 | 1.53 |
| IX | .41 | .93 | 4.75 | .07 | .72 | 2.43 |
| X* | 3.51 | 1.34 | .02 | 2.80 | 2.66 | 2.29 |
| XI* | 19.32 | .95 | 1.85 | 1.00 | 13.7 | 9.75 |
| XII* | 92.64 | .68 | 27.67 | 1.98 | 65.5 | 48.4 |

*Prior Art

While I have described my invention with respect to the details of specific embodiments thereof, many changes and variations will become obvious to those skilled in the art upon reading my description, and such can obviously be made without departing from the scope of my invention. For example, but without limitation, the invention can in principle be practical with the first element in either component having an index of refraction greater than 1.8, and with the second element in either component having an index less than 1.44; these values are considered to be practical bounds on the commercial practice of the invention.

Having thus described my invention, what I claim is:

1. A four element Galilean magnifying lens for use with an objective of focal length fo comprising a first negative element, a second positive element, a third negative element, and a fourth positive element, said first and second elements being a cemented doublet with net positive power, said third and fourth elements being a cemented doublet with net negative power sufficient to render said lens substantially afocal and said first element having an index of refraction and a first surface with a radius such that the refracting power of said first surface is between 2.3/fo and 3.5/fo.

2. The lens of claim 1, in which said second and said third elements are cemented.

3. The lens of claim 1, in which said second and said third elements are air spaced.

4. The lens of claim 1, in which said first and third elements have indices of refraction greater than 1.6 and said second and fourth elements have indices of refraction less than 1.58, and in which the difference in index of refraction between successive elements is greater than 0.2

5. The lens of claim 2, in which said first and third elements have indices of refraction greater than 1.6 and said second and fourth elements have indices of refraction less than 1.58, and in which the difference in index of refraction between successive elements is greater than 0.2.

6. The lens of claim 3, in which said first and third elements have indices of refraction greater than 1.6 and said second and fourth elements have indices of refraction less than 1.58, and in which the difference in index of refraction between successive elements is greater than 0.2

7. The lens of claim 1, in which said first and third elements have indices of refraction substantially in the range between 1.6 and 1.88 and said second and fourth elements have indices of refraction substantially in the range between 1.40 and 1.58, and in which the difference in index of refraction between successive elements is substantially in the range between 0.2 and 0.4.

8. The lens of claim 2, in which said first and third elements have indices of refraction substantially in the range between 1.6 and 1.88 and said second and fourth elements have indices of refraction substantially in the range between 1.40 and 1.58, and in which the difference in index of refraction between successive elements is substantially in the range between 0.2 and 0.4.

9. The lens of claim 3, in which said first and third elements have indices of refraction substantially in the range between 1.6 and 1.88 and said second and fourth elements have indices of refraction substantially in the range between 1.40 and 1.58, and in which the difference in index of refraction between successive elements is substantially in the range between 0.2 and 0.4.

10. An afocal attachment for use with an objective having a focal length fo, said attachment comprising four lens elements, the first of said elements having an index of refraction and a first surface with a curvature R1 selected to produce a normalized refracting power $\phi 1$ between 2.3 and 3.5 where $\phi 1$ is normalized to fo, and said elements having a characteristic number $Q1 < 1$, where $Q1 = 1000 [(0.098 + Pa) R1]^2$ in which Pa is the Petzval sum for the attachment, Pa also being normalized to fo, and having a barrel length and magnification such that $Q2 < 1$, where $Q2 = 10(BL)/fo(fo)/fs^3$ in which BL is the barrel length, and fs is the focal length of the system comprising the objective and the attachment.

11. An afocal lens, comprising a first cemented doublet of net positive power and a second cemented doublet of net negative power, said first doublet comprising a first negative element and a second positive element, said first element having an index of refraction higher than 1.65 and a first surface with a refracting power between 2.3/fo and 3.5/fo, said second element having a refractive index below 1.58, said first doublet having a cemented surface with a refracting power between −1.4/fo and −2.0/fo, said second doublet comprising a third negative element having a refractive index greater than 1.6 and a fourth positive element having a refractive index less than 1.58.

12. The lens of claim 11, in which said first doublet is cemented to said second doublet.

13. The lens of claim 11, in which said first doublet is air-spaced from said second doublet.

14. An afocal attachment for use with an objective having a focal length fo and a field greater than 40 degrees, comprising a first cemented doublet of net positive power and a second cemented doublet of net negative power, said first doublet comprising a first negative element and a second positive element, said first element having an index of refraction higher than 1.65 and a first surface with a refracting power, normalized to fo, between 2.3 and 3.5, said second element having a refractive index below 1.58, said first doublet having a cemented surface with a refracting power, normalized to fo, between −1.4 and −2.0, said second doublet comprising a third negative element having a refractive index greater than 1.6 and a fourth positive element having a refractive index less than 1.58, said lens having a value Q1≦1, where $$Q1 = 1000 \, [(0.098 + Pa) \, R1]^2,$$

where Pa is the Petzval sum of the attachment and R1 is the radius of the first surface of said first element, both normalized to fo.

15. The lens of claim 14 in which said first doublet is cemented to said second doublet.

16. The lens of claim 14 in which said first doublet is air-spaced from said second doublet.

17. An afocal attachment for use with an objective having a focal length fo and a field greater than 40 degrees, said attachment comprising four elements alternately of negative and positive power, said negative elements having indices of refraction greater than 1.6, said positive elements having indices of refraction less than 1.58, the first of said elements having a first surface with a refracting power, normalized to fo, between 2.3 and 3.5, and said attachment having values of M1<1, where M1 is the root mean square of $Q_1$ and $Q_2$ where $Q_1 = 1000 \, [(0.098 + P_a) \, R1]^2$ in which $P_a$ is the Petzval sum for the attachment and R1 is the radius of said first element both normalized to fo, and where $Q_2 = 10(BL/fo)(fo/f_s)^3$ in which BL is the barrel length and $f_s$ is the focal length of the system comprising the objective and the attachment.

18. The afocal attachment of claim 17, in which said elements are cemented.

19. The afocal attachment of claim 17, in which said first and second elements form a first cemented doublet and said third and fourth elements form a second cemented doublet air spaced from said first cemented doublet.

20. A four element Galilean magnifying lens for use with an objective having a focal length fo, comprising a first negative element, a second positive element, a third negative element, and a fourth positive element, said first and second elements being a cemented doublet with net positive power, said third and fourth elements being a cemented doublet with net negative power sufficient to render said lens substantially afocal and said first element having an index of refraction and a first surface with a radius such that the refracting power $\phi$ of said first surface is between 2.3 and 3.5, in which said elements have radii and indices of refraction chosen to produce a small negative Petzval sum Pa between 0 and −0.2, where Pa and $\phi$ are normalized to fo.

21. The lens of claim 20, in which said second and said third elements are cemented.

22. The lens of claim 20, in which said second and said third elements are air spaced.

23. The lens of claim 20, in which said first and third elements have indices of refraction greater than 1.6 and said second and fourth elements have indices of refraction less than 1.58, and in which the difference in index of refraction between successive elements is greater than 0.2.

24. The lens of claim 21, in which said first and third elements have indices of refraction greater than 1.6 and said second and fourth elements have indices of refraction less than 1.58, and in which the difference in index of refraction between successive elements is greater than 0.2.

25. The lens of claim 22, in which said first and third elements have indices of refraction greater than 1.6 and said second and fourth elements have indices of refraction less than 1.58, and in which the difference in index of refraction between successive elements is greater than 0.2.

26. The afocal lens of claim 20, in which said elements are substantially in accordance with the following table:

| Surface | Radii | Separations | | Glass Types | |
| --- | --- | --- | --- | --- | --- |
| | | Glass | Air | Nd | Vd |
| 1 | 0.2721 | | | | |
| | | 0.1218 | | 1.720 | 50.4 |
| 2 | .1528 | | | | |
| | | .0816 | | 1.465 | 65.8 |
| 3 | −1.922 | | | | |
| | | | .0214 | | |
| 4 | −4.321 | | | | |
| | | .0180 | | 1.744 | 44.8 |
| 5 | .2112 | | | | |
| | | .0820 | | 1.465 | 65.8 |
| 6 | .7479 | | | | | in which said surfaces are the surfaces of said elements in numerical order from object space to image space, said radii and separations are normalized to fo, Nd is the index of refraction, and Vd is the Abbe dispersion number.

27. The afocal lens of claim 20, in which said elements are substantially in accordance with the following table:

| Surface | Radii | Separations | | Glass Types | |
| --- | --- | --- | --- | --- | --- |
| | | Glass | Air | Nd | Vd |
| 1 | .2579 | | | | |
| | | .1218 | | 1.720 | 50.4 |
| 2 | .1612 | | | | |
| | | .0816 | | 1.465 | 65.8 |
| 3 | −2.93 | | | | |
| | | | .0021 | | |
| 4 | −2.00 | | | | |
| | | .0180 | | 1.717 | 48.0 |
| 5 | .1853 | | | | |
| | | .0820 | | 1.465 | 65.8 |
| 6 | .7580 | | | | | in which said surfaces are the surfaces of said elements in numerical order from object space to image space, said radii and separation are normalized to fo, Nd is the index of separation, and Vd is the Abbe dispersion number.

28. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | .2969 | | | | |
| | | .1181 | | 1.740 | 28.2 |
| 2 | .1619 | | | | |
| | | .0816 | | 1.501 | 56.4 |
| 3 | −1.732 | | | | |

-continued

| Surface | Radii | Separations | | Glass Types | |
| --- | --- | --- | --- | --- | --- |
| | | Glass | Air | Nd | Vd |
| | | | .0305 | | |
| 4 | −2.888 | | | | |
| | | .0180 | | 1.678 | 55.2 |
| 5 | .1755 | | | | |
| | | .0856 | | 1.492 | 57.4 |
| 6 | .5777 | | | | | in which said surfaces are the surfaces of said elements in numerical order from object space to image space, said radii and separations are normalized to fo, Nd is the index of refraction, Vd is the Abbe dispersion number and surface 6 is an asphere having the given radius at the optical axis.

29. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | .2515 | | | | |
| | | .1102 | | 1.713 | 53.8 |
| 2 | .1496 | | | | |
| | | .0814 | | 1.465 | 65.8 |
| 3 | .5623 | | | | |
| | | .0180 | | 1.713 | 53.8 |
| 4 | .1752 | | | | |
| | | .0725 | | 1.465 | 65.8 |
| 5 | .4302 | | | | | in which said surfaces are the surfaces of said elements in numerical order from object space to image space, said radii and separations are normalized to fo, Nd is the index of refraction, and Vd is the Abbe dispersion number.

30. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | .2603 | | | | |
| | | .1290 | | 1.713 | 53.8 |
| 2 | .1454 | | | | |
| | | .0850 | | 1.465 | 65.8 |
| 3 | 2.53 | | | | |
| | | .0180 | | 1.713 | 53.8 |
| 4 | .2155 | | | | |
| | | .0715 | | 1.465 | 65.8 |
| 5 | .4783 | | | | | in which said surfaces are the surface of said elements in numerical order from object space to image space, said radii and separations are normalized to fo, Nd is the index of refraction, and Vd is the Abbe dispersion number.

31. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | .2255 | | | | |
| | | .0841 | | 1.720 | 50.4 |
| 2 | .1364 | | | | |
| | | .1065 | | 1.487 | 70.4 |
| 3 | 1.705 | | | | |
| | | .0180 | | 1.788 | 50.5 |
| 4 | .1723 | | | | |
| | | .0739 | | 1.541 | 47.2 |
| 5 | .4067 | | | | | in which said surfaces are the surfaces of said elements in numerical order from object space to image space, said radii and separations are normalized to fo, Nd is the index of refraction, and Vd is the Abbe dispersion number.

32. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | 0.2606 | | | | |
| | | .1290 | | 1.720 | 50.4 |
| 2 | .1509 | | | | |
| | | .0955 | | 1.465 | 65.8 |
| 3 | −1.725 | | | | |
| | | .0180 | | 1.720 | 50.4 |
| 4 | .2066 | | | | |
| | | .0610 | | 1.465 | 65.8 |
| 5 | .6700 | | | | | in which said surfaces are the surfaces of said elements in numerical order from object space to image space, said radii and separations are normalized to fo, Nd is the index of refraction, and Vd is the Abbe dispersion number.

33. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | 0.2569 | | | | |
| | | .1218 | | 1.720 | 50.4 |
| 2 | .1500 | | | | |
| | | .0817 | | 1.465 | 65.8 |
| 3 | −2.21 | | | | |
| | | .0180 | | 1.720 | 50.4 |
| 4 | .2009 | | | | |
| | | .0820 | | 1.465 | 65.8 |
| 5 | .7332 | | | | | in which said surfaces are the surfaces of said elements in numerical order from object space to image space, said radii and separations are normalized to fo, Nd is the index of refraction, and Vd is the Abbe dispersion number.

34. The afocal lens of claim 21, in which said elements are substantially in accordance with the following table:

| Surface | Radii | Separations | | Glass Types | |
| --- | --- | --- | --- | --- | --- |
| | | Glass | Air | Nd | Vd |
| 1 | 0.2537 | | | | |
| | | 0.1218 | | 1.720 | 50.4 |
| 2 | .1465 | | | | |
| | | .0817 | | 1.465 | 65.8 |
| 3 | −1.87 | | | | |
| | | .0180 | | 1.720 | 50.4 |

-continued

| Surface | Radii | Separations | | Glass Types | |
| --- | --- | --- | --- | --- | --- |
| | | Glass | Air | Nd | Vd |
| 4 | .1954 | | | | |
| | | .0820 | | 1.465 | 65.8 |
| 5 | .7883 | | | | | in which said surfaces are the surfaces of said elements in numerical order from object space to image space, said radii and separations are normalized to fo, Nd is the index of refraction, and Vd is the Abbe dispersion number.

35. The lens of claim 20, in which said first and third elements have indices of refraction substantially in the range between 1.6 to 1.88 and said second and fourth elements have indices of refraction substantially in the range between 1.40 and 1.58, and in which the difference in index of refraction between successive elements is substantially in the range between 0.2 and 0.4.

36. The lens of claim 21, in which said first and third elements have indices of refraction substantially in the range between 1.6 and 1.88 and said second and fourth elements have indices of refraction substantially in the range between 1.40 and 1.58, and in which the difference in index of refraction between successive elements is substantially within the range between 0.2 and 0.4.

37. The lens of claim 22, in which said first and third elements have indices of refraction substantially in the range between 1.6 and 1.88 and said second and fourth elements have indices of refraction substantially within the range between 1.40 and 1.58, and in which the difference in index of refraction between successive elements is substantially within the range between 0.2 and 0.4.

38. An afocal attachment for use with an objective having a focal length fo, said attachment comprising four lens elements having a normalized Petzval sum Pa that is a negative number between 0 and −0.2, and the first of said elements having an index of refraction and a first surface with a curvature selected to produce a normalized refracting power $\phi 1$ between 2.3 and 3.5, in which Pa and $\phi 1$ are normalized to fo.

39. An afocal lens for use with an objective of focal length fo inches, comprising a first cemented doublet of net positive power and a second cemented doublet of net negative power, said first doublet comprising a first negative element and a second positive element, said first element having an index of refraction higher than 1.65 and a first surface with a refracting power between 2.3/fo and 3.5/fo, said second element having a refractive index below 1.58, said first doublet having a cemented surface with a refracting power between −1.4/fo and −2.0/fo, and said second doublet comprising a third negative element having a refractive index greater than 1.6 and a fourth positive element having a refractive index less than 1.58, said lens having a Petzval sum Pu in reciprocal inches such that Pufo=Pa and Pa is a negative number between 0 and −0.2.

40. The lens of claim 39, in which said first doublet is cemented to said second doublet.

41. The lens of claim 39, in which said first doublet is air-spaced from said second doublet.

42. An afocal lens, comprising a first cemented doublet of net positive power and a second cemented doublet of net negative power, said first doublet comprising a first negative element and a second positive element, said first element having an index of refraction substantially in the range between 1.65 and 1.88 and a first surface with a refracting power between 2.3/fo and 3.5/fo, said second element having a refractive index substantially in the range between 1.40 and 1.58, said first doublet having a cemented surface with a refracting power between −1.4/fo and −2.0/fo, said second doublet comprising a third negative element having a refractive index substantially in the range between 1.6 and 1.88 and a fourth positive element having a refractive index substantially in the range between 1.40 and 1.58.

43. An afocal attachment for use with an objective having a focal length fo and a field greater than 40 degrees, comprising a first cemented doublet of net positive power and a second cemented doublet of net negative power, said first doublet comprising a first negative element and a second positive element, said first element having an index of refraction substantially in the range between 1.65 and 1.88 and a first surface with a refracting power, normalized to fo, between 2.3 and 3.5, said second element having a refractive index substantially in the range between 1.40 and 1.58, said first doublet having a cemented surface with a refracting power, normalized to fo, between −1.4 and −2.0, said second doublet comprising a third negative element having a refractive index substantially in the range between 1.6 and 1.88 and a fourth positive element having a refractive index substantially in the range between 1.40 and 1.58, said lens having a value $Q1 \leq 1$, where $$Q1 = 1000[(0.098 + Pa) R1]^2$$

where Pa is the Petzval sum of the attachment and R1 is the radius of the first surface of said first element, both normalized to fo.

44. An afocal lens of use with an objective of focal length fo inches, comprising a first cemented doublet of net positive power and a second cemented doublet of net negative power, said first doublet comprising a first negative element and a second positive element, said first element having an index of refraction substantially in the range between 1.65 and 1.88 and a first surface with a refracting power between 2.3/fo and 3.5/fo, said second element having a refractive index substantially in the range between 1.40 and 1.58, said first doublet having a cemented surface with a refracting power between −1.4/fo and −2.0/fo, and said second doublet comprising a third negative element having a refractive index substantially in the range between 1.6 and 1.88 and a fourth positive element having a refractive index substantially in the range between 1.40 and 1.58, said lens having a Petzval sum Pu in reciprocal inches such that Pufo=Pa and Pa is a negative number between 0 and −0.2.

* * * * *